Dec. 2, 1947.   J. F. KLUIT   2,431,808
PAN HANDLE
Filed July 12, 1945

INVENTOR.
Johannes F. Kluit.
BY
Stanley Lightfoot

Patented Dec. 2, 1947

2,431,808

UNITED STATES PATENT OFFICE 2,431,808

PAN HANDLE

Johannes F. Kluit, Manistique, Mich.

Application July 12, 1945, Serial No. 604,709

1 Claim. (Cl. 16—110)

This invention relates to the handles of pans, such as cooking or frying pans, and has for its object to provide a type of handle which in cross sectional form affords a comfortable and natural grip for the hand and a resulting efficient leverage for promoting the tilting of the pan, as in pouring operations.

A further object is to provide in such a handle for its rotary adjustment to suit either right or left handed users, as the case may be.

Still further objects or advantages additional or subsidiary to the aforesaid objects, or resulting from the construction or operation of the invention as it may be carried into effect, will become apparent as the said invention is hereinafter further disclosed.

In carrying the said invention into effect, I may provide a handle of a generally triangular outline in cross section, the upper side being substantially horizontal and the two lower sides being of different angularity in their relation to the upper side, whereby the angle between one of the lower sides and the upper side is decidedly more acute than is the angle between the other lower side and the upper side, with the result that the last mentioned side is of lesser width than the other two sides; and a socket or attachment with which the handle is connected in a reversible manner whereby either one of the wider faces of the handle may be brought into topmost position so that the apex of the described triangle will be presented to the right or to the left of the axis of the handle, as may be desired; and means for locking the handle in either of its positions of adjustment. All of which is more particularly described and ascertained hereinafter, by way of example, having reference to the accompanying drawing, wherein:

Figure 1:
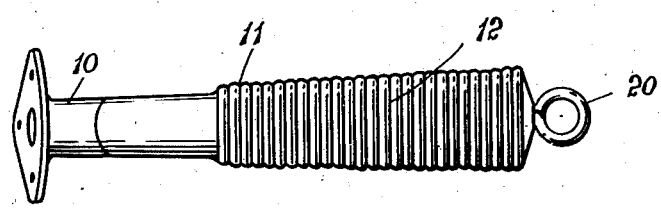
Figure 1 is a plan of a pan handle embodying the said invention.
Figure 2:
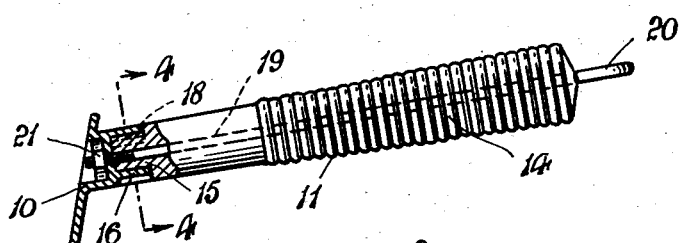
Figure 2 is an elevation of the same, partly broken away to illustrate a form of locking means.
Figure 4:
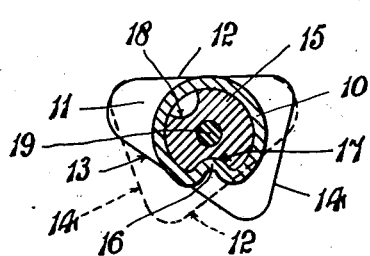
Figure 4 is a detail section taken on a plane indicated by the line 4—4 in Figure 2.
Figure 3:
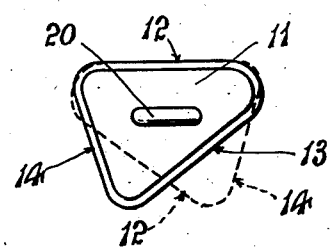
Figure 3 is an end elevation of the handle.

Similar characters of reference indicate similar parts in the several figures of the drawing; and Figures 3 and 4 are drawn to a larger scale than Figures 1 and 2.

10 is a socket or securing fixture by means of which a handle, generally numbered 11, is attached to a pan such as a frying pan, the handle in this case being of a characteristic three-sided form as shown very clearly in Figures 3 and 4.

The sides 12, 13 and 14 of the handle have the general relationship to one another of the sides of an isosceles triangle.

In the position of the handle shown in the drawing, one of the wider sides 12 is uppermost and substantially horizontal as viewed in cross section with the other wide side 13 being on the under side of the handle and extending at an acute angle to the said upper side 12, the narrower side 14 extending downwardly and inwardly at a relatively slight angle beneath the upper side 12. The corners formed by the said angular sides are smoothly rounded out, as shown.

Such a cross sectional shape of the handle (which in the position shown in full lines in Figures 3 and 4 is intended for use by a right handed person) permits the palm of the hand to extend over the topmost surface 12, with the thumb and the ball of the thumb extending over the narrower face 14 of the handle, while the fingers naturally close around and beneath the lower face 13 of the handle. This not only provides a very firm and comfortable grip, but in the act of tilting the pan the pressure of the thumb throughout practically its entire length of the said surface 14 applies a rotating force of the handle below the axis thereof, which force is also assisted in its turning effect by the upward force exerted by the fingers embracing the under side of the face 13, especially as such force is concentrated toward the apex of the triangle formed by the said sides 12 and 13.

Thus a highly efficient double leverage is applied in the tilting of the pan, simplifying such an operation even with a heavy pan without any tendency to slip from the grasp of the user or to tilt suddenly or to beyond the intended extent.

In Figures 3 and 4, the dotted lines show that the position of the apex of the triangle formed by the sides of the handle may be reversed, in relation to the general plane of a pan or article to which the handle is attached, so that the said handle may be readily adapted to use by a left handed person. When so reversed, the side 13 then becomes uppermost to receive the palm of the hand and the side 12 becomes the under surface to be grasped by the fingers. The side 14 of course continues to operate as the thumb grip.

The surfaces of the handle may be ribbed as shown or provided with any other means which may be thought necessary or desirable to assist in the maintenance of a firm grip on the said handle.

Any suitable means may be employed for securing the handle to the pan or other article, and to lock the said handle in one or other of its positions of rotary adjustment; and in Figures 2 and 4 I show a simple method of effecting this connection wherein the handle has a spigot 15 entering the tubular ferrule of the socket 10 which ferrule is shown as being provided with an internal rib 16 adapted to engage in one or other of grooves, 17 or 18, in the wall of the handle spigot 15 according to the position of rotary adjustment of the handle described.

An axial rod 19, terminating at its outer end in an eye 20 and threaded at its inner end into a nut 21, may serve as the means of securing the said parts in assembled and adjusted position, the unscrewing of the rod permitting the withdrawing of the handle from the socket to an extent sufficient to permit its rotation to bring either of the grooves 17 or 18, as the case may be, into matching relation with the rib 16.

The described handle admits of simple manufacture, ease of operation and highly efficient control of the movements of the pan or article to which it is attached.

This invention may be developed within the scope of the following claim without departing from the essential features of the said invention, and it is desired that the specification and drawing be read as being merely illustrative of a practical embodiment of the said invention and not in a strictly limiting sense.

What I claim is:

In combination with a handle socket for a frying pan or similar utensil, a pan handle characterized by the form of an isosceles triangle in cross section, means for detachably locking said handle in said socket with the narrower side of said handle situated laterally to receive the thumb of a user, whereby one of the wider sides will be uppermost to receive the palm of the hand and the other wider side undermost to receive the embracing fingers of the hand, said handle being reversible about its axis in said socket whereby the apex of the said triangle may be directed to one or other side of said axis and the upper and lower positions of said wider sides thereof accordingly reversed, and means for locking said handle in either of such positions of rotary adjustment.

JOHANNES F. KLUIT.

REFERENCES CITED

The following references are of record in the file of this patent:

UNITED STATES PATENTS

| Number | Name | Date |
|---|---|---|
| 605,828 | Pritchard | June 14, 1898 |
| 2,205,769 | Sweetland | June 25, 1940 |
| 1,333,760 | Lamb | Mar. 16, 1920 |
| 1,605,981 | Pfefferkorn | Nov. 9, 1926 |
| 1,705,858 | Finkelstein | Mar. 19, 1929 |
| 2,246,393 | Sperry | June 17, 1941 |
| 2,124,615 | Foltz | July 26, 1938 |
| 2,250,709 | Hummel | July 29, 1941 |

FOREIGN PATENTS

| Number | Country | Date |
|---|---|---|
| 422,254 | Great Britain | Jan. 8, 1935 |
| 1,893 | Great Britain | 1901 |